United States Patent [19]

McEwen

[11] Patent Number: 5,693,909
[45] Date of Patent: Dec. 2, 1997

[54] ELECTRICAL DEVICE BOX FOR MOUNTING IN A CLEAN ROOM

[76] Inventor: Boyd L. McEwen, 1576 14½ St., Barron, Wis. 54812

[21] Appl. No.: 655,610

[22] Filed: May 30, 1996

[51] Int. Cl.[6] .......................... H01R 13/502; H01H 9/04
[52] U.S. Cl. ............................................ 174/58; 220/3.3
[58] Field of Search ........................... 174/58, 53, 50, 174/48, 17 CT, 66; 220/241, 3.92, 3.94, 4.02, 3.3, 3.8

[56] References Cited

U.S. PATENT DOCUMENTS

| | | | |
|---|---|---|---|
| 1,481,415 | 1/1924 | Casper | 220/4.02 |
| 2,680,533 | 6/1954 | Cole | 220/3.8 X |
| 2,991,327 | 7/1961 | Bellek | 174/53 |
| 3,197,548 | 7/1965 | Weitzman et al. | 220/3.3 X |
| 3,392,228 | 7/1968 | Zerwes | 220/3.8 X |
| 3,597,523 | 8/1971 | Guritz | 220/3.94 X |
| 3,728,470 | 4/1973 | Maier | 220/3.92 X |
| 4,223,796 | 9/1980 | Silver | 220/3.8 |
| 4,265,365 | 5/1981 | Boteler | 174/53 X |
| 5,237,128 | 8/1993 | Wuertz | 174/48 |
| 5,296,647 | 3/1994 | Banker | 174/58 |

OTHER PUBLICATIONS

Northland Electrical Supply Company, 1993 catalog, pp. 26 and 42.

*Primary Examiner*—Kristine L. Kincaid
*Assistant Examiner*—Dean A. Reichard
*Attorney, Agent, or Firm*—Burd, Bartz & Gutenkauf

[57] ABSTRACT

An electrical device box to mount an electrical device such as a wall switch in a clean room. The device box is of seamless, stainless steel construction, having side walls, end walls and a back wall defining a housing with a planar front opening. Device flanges are recessed within the front opening for mounting the electrical device. A sealing gasket is fitted over the front opening with the electrical device installed therein. The box can be readily cleaned using the usual harsh and abrasive cleaning materials in a clean room wash-down. The box has no cracks, crevices or other openings to collect dirt and permit bacterial growth.

8 Claims, 2 Drawing Sheets

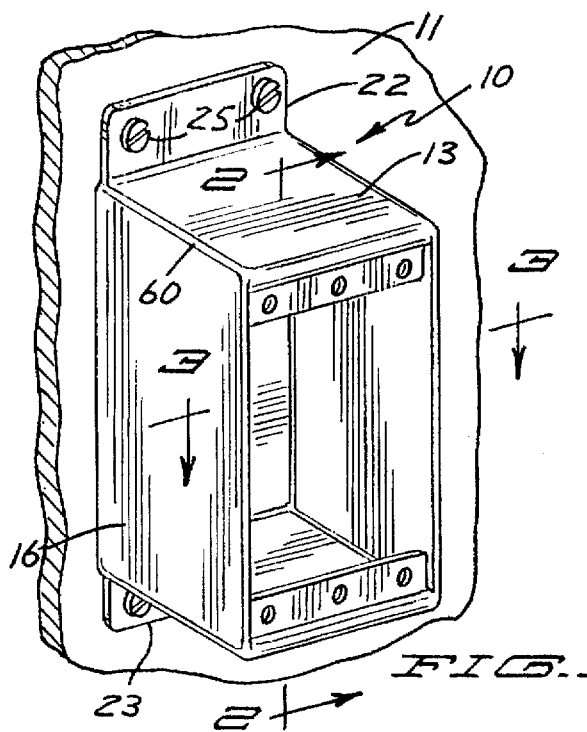
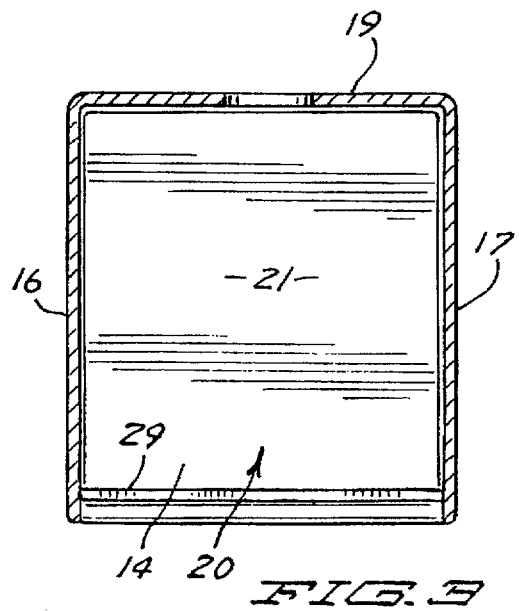
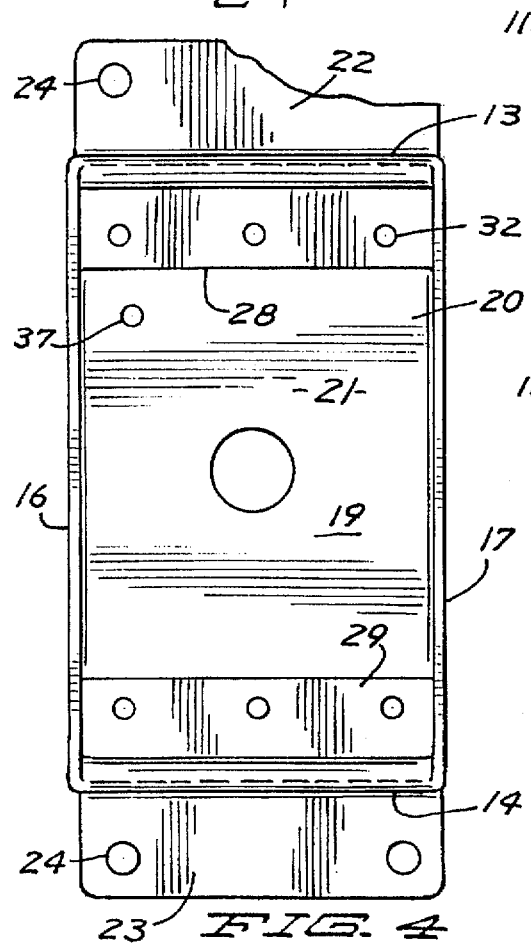
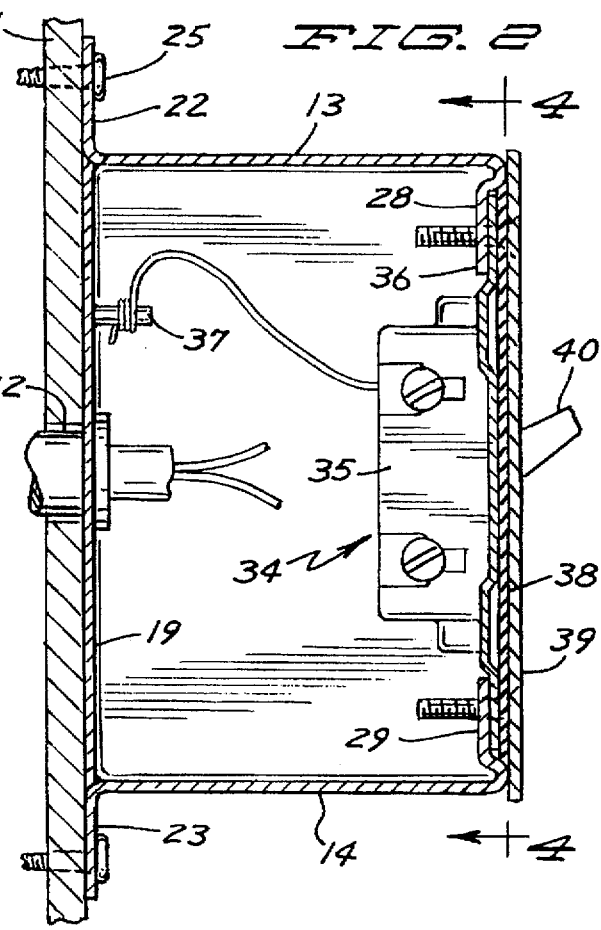

ELECTRICAL DEVICE BOX FOR MOUNTING IN A CLEAN ROOM

BACKGROUND OF THE INVENTION

Certain processing functions require a very clean room both for purposes of efficiency accompanying the processing objective, and, as often as not, to comply with government regulations. Examples of such establishments are food processing plants. These include plants for processing of cheese, poultry, meats and the like. Public safety requires the utmost sanitation. There are frequent wash-downs of processing rooms. Harsh soaps and disinfectant chemicals are used. They are sprayed and scrubbed on the room surfaces.

Troublesome areas in clean rooms include places where there are cracks, crevasses, cavities and like openings. These areas collect and can harbor dirt and foster bacterial growth so as to compromise the cleanliness of the environment. One source of such a home for bacterial breading is electrical device boxes of the type that carry switches, outlets and the like. These boxes are typically of a multi-piece construction with various cracks and openings. They have seams that can collect foreign matter and are hard to clean.

Another problem confronting clean room electrical device boxes is the hostile environment to which they are subject. Cleaning chemicals are harsh and abrasive. Certain water tight boxes are available, constructed of cast aluminum, plastic or malleable cast iron. Cast aluminum is prone to a high degree of corrosion from wash-down chemicals. Plastic boxes are structurally inferior. The cast iron box is also subject to corrosion and can have a roughened surface that promotes bacterial growth.

SUMMARY OF THE INVENTION

The invention pertains to an electrical device box specifically designed and constructed for use in clean rooms that are subject to frequent wash-down with harsh soaps and disinfectant chemicals. The box is formed of stainless steel to withstand the rigors of the wash-down with the harsh chemicals. The box has no seams to collect dirt and foster growth of bacteria. The box is formed of three pieces of stainless steel joined with smooth and continuous welds. Interior and exterior corners of the box are rounded.

The box has end walls, side walls and a back wall. Mounting flanges extends straight outward from the back wall. The outer edges of the end walls and side walls form the outer perimeter of the box opening. Receptacle flanges for mounting an electrical device are located fixed to the end walls and are recessed from the plane of the box opening. A receptacle flange is formed by an extension of the end wall that is turned 180 degrees to form a rounded corner at the edge of the end wall. From there a lip extends parallel to the back wall to form the flange. The receptacle flanges mount an electrical device such as the switch or a plug. Once the device is installed in the box, a water tight sealing gasket can be placed over the box opening. The gasket is covered by a device cover of plastic, aluminum or the like.

As so configured and installed, the box is readily cleaned. There is no hidden dirt which will promote the growth of bacteria. The box is structurally sound. It will not easily break. The box is attractive.

IN THE DRAWINGS

FIG. 1 is a perspective view of an electrical device box according to the invention mounted on a wall;

FIG. 2 is a sectional view of the electrical device box of FIG. 1 taken along the line 2—2 thereof and having an electrical switch mounted in it;

FIG. 3 is a sectional view of a portion of the electrical device box of FIG. 1 taken along the line 3—3 thereof and showing a downwardly irking sectional view of the box;

FIG. 4 is a front elevational view of the box of FIG. 2 taken along the line 4—4 thereof, but having the electrical switch, gasket and cover removed for purposes of illustrations;

DESCRIPTION OF A PREFERRED EMBODIMENT

Figure 5:
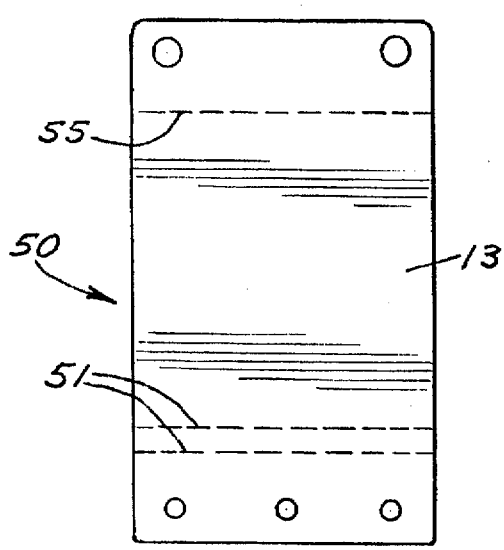
FIG. 5 is a schematic view of a blank used in forming a part of an electrical device box according to the invention.

Referring to the drawings, there is shown in FIG. 1 an electrical device box indicated generally at 10 installed on a wall 11 of a clean room where sanitation is important such as in a food processing plant.

Box 10 includes a housing comprised of first and second parallel end walls 13, 14, and parallel side walls 16, 17 in perpendicular relationship to the end walls. A back wall 19 is fixed to the rear edges of the side walls and end walls. The front edges of the side walls and end walls of the box define a box opening 20 leading to the interior space of the box or the chamber 21.

A first mounting flange 22 extends upward from the back wall 19 in the box orientation shown in FIG. 1. A second mounting flange 23 extends downward from the back wall. The mounting flanges 22, 23 are constituted as integral extensions of the back wall 19. Mounting holes 24 are provided in the mounting flanges for receipt of mounting screws 25 to mount the device box to the wall 11.

Device flanges are located within the housing of the device box 10 and are recessed from the plane of the front opening 20. A first device flange 28 extends downwardly from the upper end wall 13 in the chamber 21, and has a planar mounting surface facing the opening 20. The device mounting flange 28 extends substantially the entire width between the side walls 16, 17 of device box 10. A symmetrical device flange 29 extends upwardly from the opposite end wall 14 into the chamber 21, also presenting a planar mounting surface that is recessed from the front opening 20 and extends substantially the width of the chamber 21 between the side walls 16, 17.

Figure 2A:
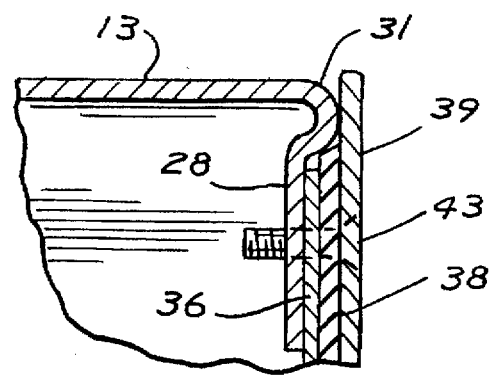
FIG. 2A is an enlarged view of a corner of the electrical device box assembly of FIG. 2.

The device flanges are recessed within the chamber 21 from the front opening 20 of the housing of device box 10. Each device flange is constituted as an integral extension of an end wall. As shown in FIG. 2A, the forward edge of end wall 13 has an inwardly hook shaped portion 31 that extends into the chamber 21. A lip-like extension from the inner end of the hooked shaped portion 31 forms the device flange 28. As shown in FIG. 2, first and second device flanges 28, 29 are constructed in like fashion.

Each device flange carries a plurality of screw openings 32 for mounting the electrical device and a cover plate (FIG. 4). In FIG. 2, an on/off switch 34 is mounted in the device box 10. The on/off switch 34 includes a switch body 35 with upper and lower mounting brackets 36 as is typical of standard electrical switches. An actuator arm 40 extends from the switch body 35 outward of the front opening 20 of the housing of the device box 10. Suitable mounting screws mount the switch brackets 36 to the recessed device mounting flanges 28, 29.

A sealing gasket 38 is located over the front opening 20 of the device box 10 and over the switch brackets 36. Sealing gasket 37 is rectangular in shape and of dimensions to fit snugly within the opening 20 of the housing of box 10. The sealing gasket 38 has a suitable slit opening for accommodation of the switch arm 40. A rigid cover plate 39 is installed over the sealing gasket 38 and is in bearing relationship to the front edge of the housing. Suitable mounting screws hold the cover plate 39 relative to the device flanges 28, 29.

The sealing gasket 38 forms a moisture tight seal to the chamber 21.

Device box 10 is simply constructed to avoid open seams or cracks that can be difficult to clean and lead to the growth of bacteria.

Figure 6:
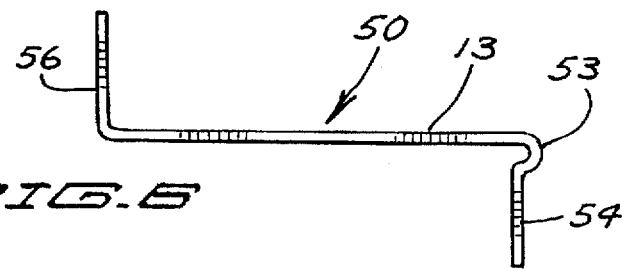
FIG. 6 is a side view of the blank of FIG. 5 after having been formed into a shape for assembly into an electrical device box.

Stainless steel blanks as shown in FIGS. 5 and 6 form the end walls, mounting flanges and device flanges of the box. A blank 50 is rectangular and is formed of stainless steel. One end of blank 50 is bent at phantom lines 51 into a hook portion 53 with an outwardly extended lip 54. The hook portion 53 becomes an end wall forward edge 31. The lip 54 becomes one of the device flanges. The opposite end of the blank 50 is bent in the opposite direction at the phantom line 55 forming an outward extension 56 that becomes a mounting flange. The central portion between the outward extension 56 and the lip 54 is an end wall.

Figure 7:
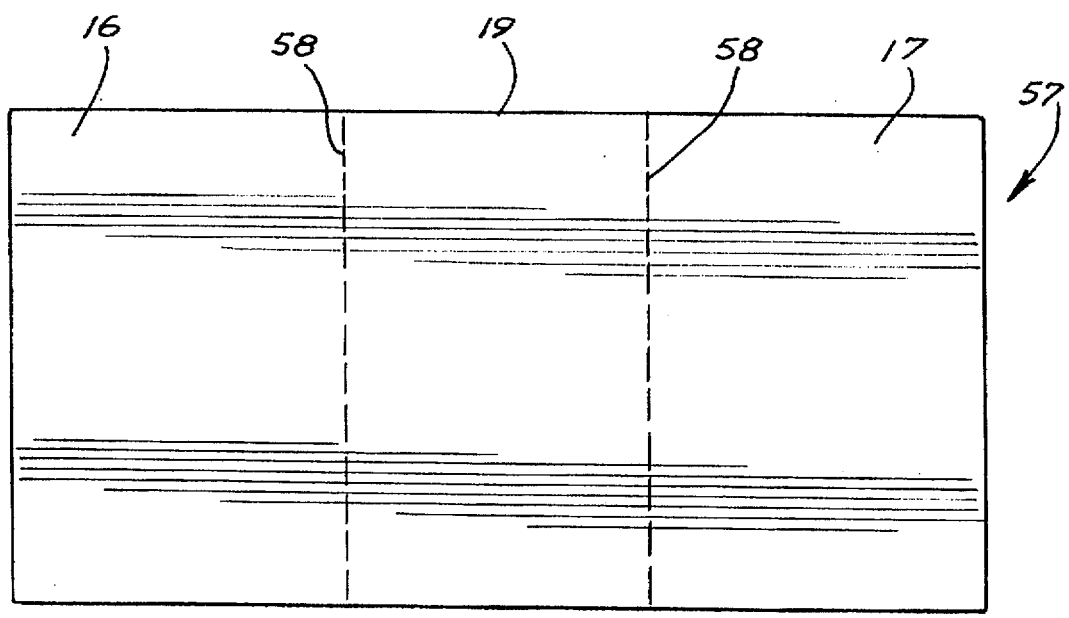
FIG. 7 is a schematic view of another blank used in formation of the electrical device box.

A blank 57 is shown in FIG. 7. The blank 57 is rectangular and formed of stainless steel. The blank 57 is bent at right angles at the two phantom lines 58 to form the back wall 19 and the side walls 16, 17 of the housing of a device box 10.

The end walls and side walls are assembled using smooth welds at the corners as at 60 in FIG. 1. The finished product is a unitary box without seams or sharp corners, one that is easily cleaned, strong and durable, and attractive.

While there has been shown and described a certain preferred embodiment of the invention, it will be apparent that certain deviations can be had without departing from the scope and spirit of the claims.

The embodiments of the invention in which an exclusive property or privilege is claimed, are defined as follows:

1. An electrical device box for mounting in a clean room, comprising:
    a housing having parallel, spaced apart first and second side walls, parallel spaced apart first and second end walls assembled in perpendicular relationship to the side walls, and a back wall connected to the end walls and side walls in a box like configuration, said end walls and side walls having forward edges defining a planar front opening;
    first and second mounting flanges extended outward from the first and second end walls in co-planar relationship to the back wall constituted as integral extensions of the back wall and coextensive with a width of the back wall to permit flush mounting on a clean room wall;
    first and second device flanges positioned in the housing and recessed from the front opening, and connected to the first and second end walls, positioned parallel to the back wall and each having a width substantially co-extensive with an interior distance between the side walls.

2. The electrical device box of claim 1 wherein:
    said side walls, end walls, back wall, mounting flanges and device flanges are made of stainless steel.

3. An electrical device box for mounting in a clean room, comprising:
    a housing having parallel, spaced apart first and second side walls, parallel spaced apart first and second end walls assembled in perpendicular relationship to the side walls, and a back wall connected to the end walls and side walls in a box like configuration, said end walls and side walls having forward edges defining a planar front opening;
    first and second mounting flanges extended outward from the first and second end walls in co-planar relationship to the back wall;
    first and second device flanges positioned in the housing and recessed from the front opening, and connected to the first and second end walls, positioned parallel to the back wall and each having a width substantially co-extensive with an interior distance between the side walls;
    said first and second device flanges being formed from extensions of the first and second end walls respectively, each of said end walls comprising a hook shaped portion and an inwardly extended lip, said hook shaped portion forming the forward edge of the end wall, and said inwardly extended lip forming the respective device flange.

4. The electrical device box of claim 3 wherein:
    the box housing is formed of three pieces of stainless steel welded together;
    one piece being formed from a rectangular blank and bent to form the side walls and the back wall;
    the other two pieces forming said end walls, mounting flanges and device flanges, each piece being rectangular initially and being bent at one end to form said hook shaped portion and said inwardly extended lip that becomes one of said device flanges, and bent at the other end in the opposite direction at a right angle to form the mounting flange.

5. The electrical device box of claim 3 wherein:
    each of said mounting flanges has a plurality of mounting openings to fix the device box to a building wall.

6. The electrical device box of claim 4 wherein:
    each of said device flanges has a plurality of mounting openings for mounting an electrical device to the box.

7. The electrical device box of claim 3 including:
    a sealing gasket for mounting at the planar front opening of the housing, having dimensions for a snug fit within the front opening.

8. The electrical device box of claim 7 wherein:
    said side walls, end walls, back wall, mounting flanges and device flanges are made of stainless steel.

* * * * *